United States Patent [19]
Venable

[11] Patent Number: 5,385,677
[45] Date of Patent: Jan. 31, 1995

[54] FIBER OPTIC PHOTOCHEMICAL OXIDATION DECONTAMINATION OF AQUEOUS LEACHATE PLUMES

[76] Inventor: William B. Venable, P.O. Box 736, Tallassee, Ala. 36078

[21] Appl. No.: 56,357

[22] Filed: Apr. 30, 1993

[51] Int. Cl.$^6$ ............................................. C02F 1/32
[52] U.S. Cl. ................... 210/748; 210/192; 210/901; 250/504 R; 250/256; 166/65.1
[58] Field of Search ............ 250/504 R, 504 H, 594.1, 250/256; 166/249, 65.1; 210/748, 192, 243, 901; 422/24; 405/128, 258

[56] References Cited

U.S. PATENT DOCUMENTS

| | | | |
|---|---|---|---|
| 4,376,637 | 10/1980 | Yang | 55/131 |
| 4,434,654 | 3/1984 | Hulsing, II et al. | 166/255 |
| 4,538,278 | 8/1985 | Gergely | 372/70 |
| 4,564,458 | 1/1986 | Burleson | 210/747 |
| 4,664,809 | 5/1987 | Fenton et al. | 210/663 |
| 4,844,807 | 7/1989 | Manchak, Jr. | 210/682 |
| 4,849,114 | 7/1989 | Zeff et al. | 210/747 |
| 4,861,484 | 8/1989 | Lichtin et al. | 210/638 |
| 5,032,042 | 7/1991 | Schuring et al. | 405/258 |
| 5,035,784 | 7/1991 | Anderson et al. | 210/909 |
| 5,057,227 | 10/1991 | Cohen | 210/680 |
| 5,084,617 | 1/1992 | Gergely | 250/253 |
| 5,140,319 | 8/1992 | Riordan | 340/854.9 |
| 5,161,914 | 11/1992 | Rahn et al. | 405/128 |
| 5,166,747 | 11/1992 | Schroeder et al. | 250/256 |
| 5,173,092 | 12/1992 | Rudder | 55/53 |
| 5,180,503 | 1/1993 | Gorelick et al. | 210/758 |
| 5,220,958 | 6/1993 | Bernhardt | 166/67 |
| 5,221,159 | 6/1993 | Billings et al. | 405/128 |
| 5,246,309 | 9/1993 | Hobby | 405/128 |
| 5,252,226 | 10/1993 | Justice | 210/739 |
| 5,256,264 | 10/1993 | Hundenborn et al. | 204/149 |
| 5,266,213 | 11/1993 | Gillham | 210/747 |
| 5,318,699 | 6/1994 | Robertson et al. | 210/151 |

FOREIGN PATENT DOCUMENTS 3162089 7/1988 Japan ..................... 422/24

OTHER PUBLICATIONS

Eccles et al, *In Situ Monitoring at Superfund Liter with Fiber Optics*, US EPA/600/X-87/156, Jun. 1987.

*Primary Examiner*—Cynthia l. Nessler

[57] ABSTRACT

The Fiber Optic Photochemical Oxidation Decontamination (FOPOD) method and apparatus is provided for in-situ remediation of aqueous leachate plumes. The apparatus consists of a well-type housing with numerous holes drilled for a distance equal to the vertical depth of the leachate plume. The bottom of the housing is capped. Through the holes are threaded numerous specialty optical fibers, being encased in the housing and forming bundles above ground. The method comprises ultraviolet light perpendicular to the bundles being transmitted sub-surface by the optical fibers which exit each hole within the plume. Hydrogen peroxide injected into the housing also enters the plume through the numerous holes in the housing. The reaction products are carbon dioxide and water.

6 Claims, 1 Drawing Sheet

FIBER OPTIC PHOTOCHEMICAL OXIDATION DECONTAMINATION OF AQUEOUS LEACHATE PLUMES

BACKGROUND OF THE INVENTION

1. Field of the Invention

The present invention relates to a method and apparatus for a Fiber Optic Photochemical Oxidation Decontamination or FOPOD system for in-situ including in-vivo remediation of aqueous leachate plumes.

2. Discussion of the Prior Art

The most common way of remediating contaminated groundwater plumes is to use some combination of injection and extraction wells. Extraction wells are used to lower the piezometric surface, creating a hydraulic gradient that draws the plume to the wells. Injection wells raise the water table and push the plume away. By regulating the pumping rates of these wells and by careful location of these wells, plumes can be drawn toward extraction wells. Extracted contaminated groundwater must be then treated and either reinjected back into the aquifer, reused or released into the local surface water system. The maintenance and operational costs of hydrodynamic control of contaminated groundwater plumes is extremely high since the wells must be pumped for many years.

Chemical and photochemical oxidation methods, evolving in recent years, for leachate plume remediation still use the pump and treat method. The groundwater must be pumped to the surface, where it is either filtered with activated charcoal to capture unwanted chemicals or exposed to ultraviolet light after exposure to hydrogen peroxide, ozone or titanium dioxide to break compounds into acceptable substances. The problem with this approach is that billions of dollars are being wasted on variations of the same unproductive pump and treat methods.

Alternatives to pump and treat include underground stripping, which involves surrounding a plume of contaminants with a ring of wells where stream is injected to mobilize the chemicals and send them into a central retrieval well. The are then sucked out by a vacuum cleaning process known as vapor extraction. Many of these treatment processes do not destroy the contaminant but merely transfer the contaminant from the water to another environment which will then require additional attention. These conventional chemical oxidation methods are also generally ineffective and very expensive.

Even though U.S. Pat. No. 5,130,032 to Sartori discloses an electrostatic ozone chemical oxidation method, the contaminated water must still be pumped before treated. With the development of many technologies for treating contaminated leachate plumes, there is no prior art for the in-vivo treatment of aqueous leachate plumes. Some attempts have been made at groundwater protection, such as U.S. Pat. No. 4,624,604 to Wagner et al. whereas treated leakage is collected by a drain system and is recovered therefrom for subsequent treatment and/or disposal. Again, this does not comprise art related to this invention for in-vivo remediation of aqueous leachate plumes.

BRIEF SUMMARY OF THE INVENTION

In accordance with the present invention there is provided a novel apparatus and method for the in-vivo remediation of aqueous leachate plumes. Optical fibers are threaded through numerous holes in a well-type housing that is capped on the distal end. This apparatus is lowered into a conventional borehole which has been drilled by current conventional methods through the leachate plume within an aquifer. The optical fibers extend through the top of the well-type housing above ground. The top of the well-type housing, now referred to as the FOPOD well, is also the entry point of the injected hydrogen peroxide. Ultraviolet lamps mounted perpendicular to the top of the FOPOD well transmit ultraviolet light through the fibers into the sub-surface aquifer to expose the hydrogen peroxide and leachate plume to the ultraviolet light. Thus, photochemical oxidation decontamination occurs in-vivo without the necessity of pumping the leachate plume or contaminated water to the surface for treatment. Hydrogen peroxide is injected directly into the aqueous leachate plume through the FOPOD well. The ultraviolet light at 366 nanometers or less reacts with the hydrogen peroxide molecules to form hydroxyl radicals. These powerful chemical oxidants then react with the contaminants in the water. The end products of this reaction mechanism are carbon dioxide and water.

DETAILED DESCRIPTION OF THE INVENTION

Figure 1:
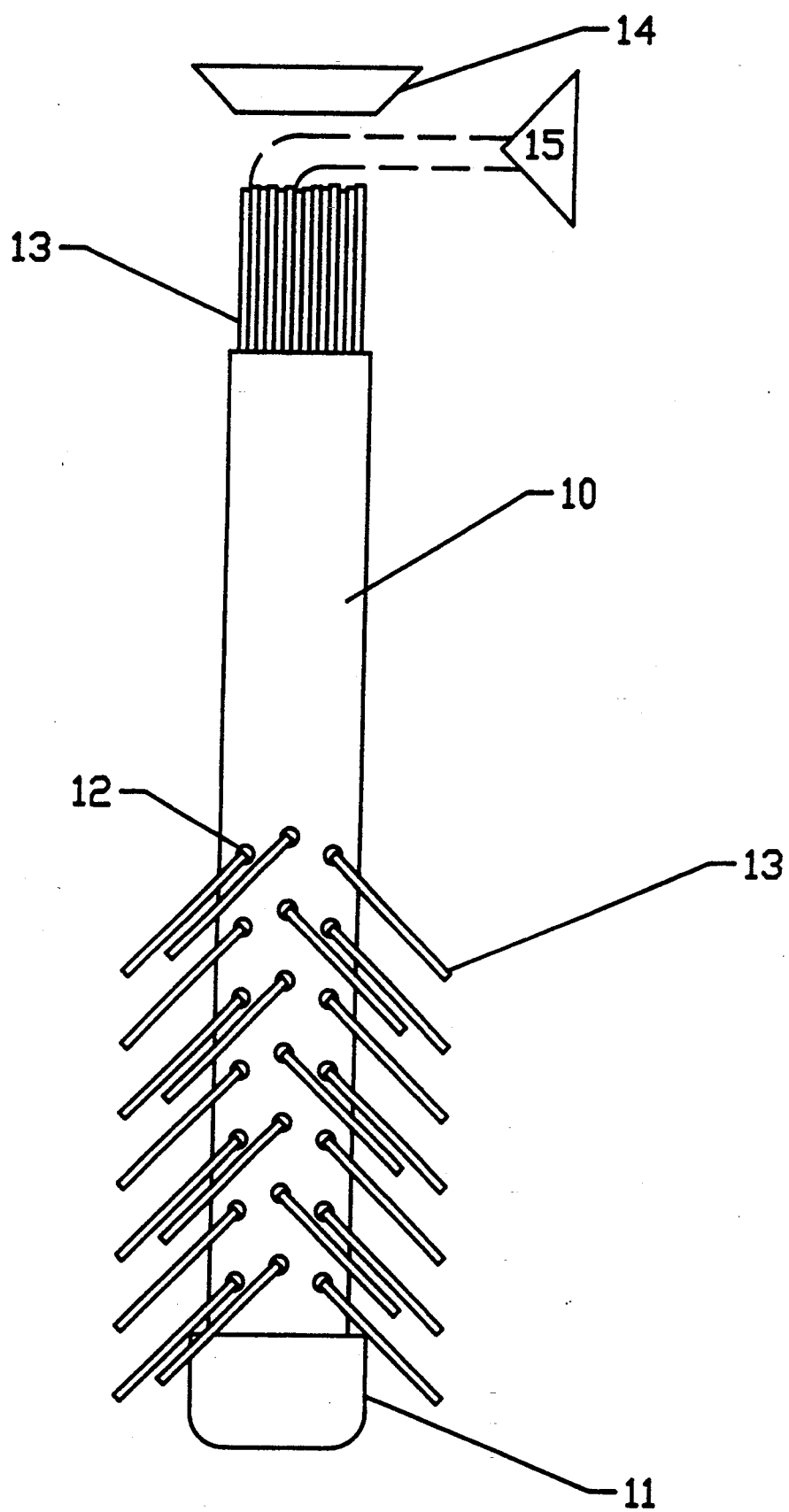
FIG. 1 is a schematic view of the preferred embodiment of the present invention.

Thousands of single optical fibers can be brought together into a bundle. The bundles can then be bound into a cable. These bundles or cables maintain some of the flexibility of the individual fibers and can be twisted or bent to transmit light around corners. The FOPOD apparatus places the bundles of fibers above ground encased in a well-type housing, referred to as a FOPOD well 10. The bundles of fibers extend through the FOPOD well in the internal space, then separate into individual fibers or smaller bundles to be threaded through numerous exit holes. The fibers 13 are illustrated at the top of the FOPOD well and again as each fiber or smaller bundle exits 13 the FOPOD well into the leachate plume. The exposed distal ends of the fibers transmit the ultraviolet light into the plume. The fibers 13 can range in core diameters and are specialty fibers designed for ultraviolet to visible light transmission. These multi-mode power-core fibers are used for military system applications and a wide variety of environmental requirements. These specialty fibers have a technology enhanced silica cladding which is a hard cladding and yields fiber strength and reduces static fatigue in humid environments. The FOPOD well is capped on bottom 11 and extends through the vertical depth of the contaminated plume. Fiber holes 12 also extend the vertical depth of the plume within the aquifer. The holes are drilled around the FOPOD well on all sides. Ultraviolet lamps at 366 nanometers or less are placed in a position that is perpendicular to the bundles of optical fibers extending from the top of the FOPOD well above the ground. Hydrogen peroxide 15, at a concentration and amount that is appropriate for the depth, flow rate and type of contaminant of the leachate plume is injected into the top of the FOPOD well. When the hydrogen peroxide enters the plume through the fiber holes in the FOPOD well, the ultraviolet lamp 14 is activated and ultraviolet light is then transmitted through the optical fibers into the plume by means of the numerous exit holes in the FOPOD well. Thus, the photons of ultraviolet light react with the hydrogen peroxide molecules to form hydroxyl radicals. These oxidants then react with the contaminants in the water. In addition to cost-effectiveness, the process converts contaminants to carbon dioxide and water without air emissions or residual waste by-products. Hydrogen peroxide is a less expensive source of hydroxyl radicals than other sources currently being used with oxidation techniques. Furthermore, the other common oxidants either contain halogens or metals which may form undesirable by-products. Hydrogen peroxide as an oxidant has advantages in addition to cost-effectiveness such as an unlimited dosing capability, no toxic fumes or gases, is safe and readily available and is easily pumped and stored.

The complete fiber optic photochemical oxidation decontamination or FOPOD system of aqueous leachate plume remediation offers the following advantages: It can be used at any depth, can be used in any climate or temperature, can be shaped to fit any site, requires no site preparation other than FOPOD wells placed in boreholes drilled by any conventional method and the FOPOD well can be capped and left for later use. The contaminated plume can be halted in its flow and remediated at the same time by the FOPOD process.

The invention being described, it will be apparent to one of ordinary skill in the art that many changes and modifications can be made thereto without departing from the spirit or scope of the appended claims.

I claim:

1. An apparatus for oxidizing contaminants present in a contaminated liquid, the apparatus comprising:
   a housing having a circumference, an upper end, a distal end, and a cap disposed on said distal end;
   a source of an oxidizing agent, said oxidizing agent having a flow rate;
   means for adjusting the flow rate of said oxidizing agent;
   inlet means disposed at the upper end of said housing for introducing said oxidizing agent into said housing;
   a plurality of outlet openings disposed around the circumference of said housing, said plurality of outlet openings defining means for discharging said oxidizing agent;
   at least one ultraviolet lamp, said at least one ultraviolet lamp having an output power;
   means for adjusting the output power of said at least one ultraviolet lamp; and,
   a plurality of optical fibers perpendicularly connected to and extending from said at least one ultraviolet lamp, said plurality of optical fibers extending through said housing each of said plurality of optical fibers further having a distal end, each of said plurality of outlet openings having the distal end of at least one of said plurality of optical fibers extending therethrough.

2. The apparatus of claim 1, wherein said oxidizing agent is hydrogen peroxide.

3. The apparatus of claim 1, wherein said means for adjusting said output power further comprises means for adjusting said output power as a function of the flow rate of said oxidizing agent.

4. A method for the in-situ remediation of an aqueous leachate plume within an aquifer, said method comprising:
   drilling a borehole into said aquifer;
   placing at least one ultraviolet lamp at an aboveground location proximate said borehole, said at least one ultraviolet lamp having an output power, said at least one ultraviolet lamp further comprising means for adjusting said output power;
   lowering an apparatus through said borehole into said aqueous leachate plume within said aquifer, the apparatus comprising:
   a housing having a circumference, an upper end, a distal end, and a cap disposed on said distal end;
   a source of an oxidizing agent, said oxidizing agent having a flow rate;
   means for adjusting the flow rate of said oxidizing agent;
   inlet means disposed at the upper end of said housing for introducing said oxidizing agent into said housing;
   a plurality of outlet openings disposed around the circumference of said housing, said plurality of outlet openings defining means for discharging said oxidizing agent;
   a plurality of optical fibers perpendicularly connected to and extending from said at least one ultraviolet lamp, said plurality of optical fibers extending through said housing, each of said plurality of optical fibers further having a distal end, each of said plurality of outlet openings having the distal end of at least one of said plurality of optical fibers extending therethrough;
   introducing said oxidizing agent into said inlet means, through said housing, through said plurality of outlet openings, and into said aqueous leachate plume;
   transmitting ultraviolet light generated by said at least one ultraviolet lamp through the distal end of each of said plurality of optical fibers into said aqueous leachate plume;
   wherein contaminants present in said aqueous leachate plume are oxidized by contact with said oxidizing agent and said ultraviolet light.

5. The method of claim 4, wherein said oxidizing agent is hydrogen peroxide.

6. The method of claim 4, further comprising adjusting the output power of said at least one ultraviolet lamp as a function of the flow rate of said oxidizing agent.

* * * * *